(12) United States Patent
Tsai et al.

(10) Patent No.: US 11,563,467 B2
(45) Date of Patent: Jan. 24, 2023

(54) PRECODING-MATCHED CSI FEEDBACK IN MOBILE COMMUNICATIONS

(71) Applicant: MediaTek Inc., Hsinchu (TW)

(72) Inventors: Lung-Sheng Tsai, Hsinchu (TW); Jiann-Ching Guey, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 17/394,384

(22) Filed: Aug. 4, 2021

(65) Prior Publication Data

US 2022/0060222 A1 Feb. 24, 2022

Related U.S. Application Data

(60) Provisional application No. 63/067,358, filed on Aug. 19, 2020.

(51) Int. Cl.
| | |
|---|---|
| *H04B 7/02* | (2018.01) |
| *H04B 7/0417* | (2017.01) |
| *H04W 24/08* | (2009.01) |
| *H04B 7/06* | (2006.01) |
| *H04B 7/0456* | (2017.01) |

(52) U.S. Cl.
CPC ......... *H04B 7/0417* (2013.01); *H04B 7/0486* (2013.01); *H04B 7/0626* (2013.01); *H04B 7/0632* (2013.01); *H04W 24/08* (2013.01)

(58) Field of Classification Search
CPC .. H04B 7/0417; H04B 7/0486; H04B 7/0626; H04B 7/0632; H04B 7/0456; H04B 7/0617; H04B 7/063; H04W 24/08; H04W 24/10

USPC .......................................................... 375/267
See application file for complete search history.

(56) References Cited

U.S. PATENT DOCUMENTS

| | | | | |
|---|---|---|---|---|
| 8,687,741 | B1* | 4/2014 | Erell | H04J 11/0076 455/434 |
| 9,401,748 | B2* | 7/2016 | Chen | H04B 7/043 |
| 9,917,629 | B2* | 3/2018 | Geirhofer | H04B 7/0632 |
| 11,108,526 | B2* | 8/2021 | Sarkis | H04L 5/0057 |
| 2008/0043867 | A1* | 2/2008 | Blanz | H04B 7/0632 714/752 |
| 2011/0268067 | A1* | 11/2011 | Seo | H04L 1/0026 370/329 |
| 2013/0155973 | A1 | 6/2013 | Geirhofer et al. | |

(Continued)

OTHER PUBLICATIONS

Taiwan Intellectual Property Office, Office Action for Taiwan Patent Application No. 110129371, dated Nov. 9, 2022.

*Primary Examiner* — Helene E Tayong
(74) *Attorney, Agent, or Firm* — Han IP PLLC; Andy M. Han

(57) ABSTRACT

Examples pertaining to precoding-matched channel state information (CSI) feedback in mobile communications are described. An apparatus (e.g., UE) beamforms one or more of a plurality of ports used in reception of a channel state information reference signal (CSI-RS) with one or more precoders that are applied on one or more of the plurality of ports used in reception of a demodulation reference signal (DMRS) or a physical downlink shared channel (PDSCH). The apparatus generates a CSI feedback comprising at least a plurality of channel quality indication (CQIs) with respect to a plurality of hypothesized ranks. The apparatus then transmits the CSI feedback to a network.

17 Claims, 5 Drawing Sheets

(56) References Cited

U.S. PATENT DOCUMENTS

| | | | | |
|---|---|---|---|---|
| 2014/0254517 A1* | 9/2014 | Nam | ..................... | H04B 7/0456 370/329 |
| 2016/0112099 A1* | 4/2016 | Lee | ...................... | H04B 7/0413 370/252 |
| 2019/0349033 A1* | 11/2019 | Fakoorian | ............ | H04B 7/0417 |

* cited by examiner

PRECODING-MATCHED CSI FEEDBACK IN MOBILE COMMUNICATIONS

CROSS REFERENCE TO RELATED PATENT APPLICATION(S)

The present disclosure is part of a non-provisional application claiming the priority benefit of U.S. Patent Application No. 63/067,358, filed 19 Aug. 2020, the content of which being incorporated by reference in its entirety.

TECHNICAL FIELD

The present disclosure is generally related to mobile communications and, more particularly, to precoding-matched channel state information (CSI) feedback in mobile communications.

BACKGROUND

Unless otherwise indicated herein, approaches described in this section are not prior art to the claims listed below and are not admitted as prior art by inclusion in this section.

In mobile communications based on the $3^{rd}$ Generation Partnership Project (3GPP) standards, currently there are two types of channel state feedback (CSF) configurations under sounding reference signal (SRS) usage with antenna switching, namely CSF report quantity=cri-RI-PMI-CQI and CSF report quantity=cri-RI-CQI. For CSF report quantity=cri-RI-PMI-CQI, a user equipment (UE) needs to determine its achievable channel quality indication (CQI) over choices of rank and precoding matrix index (PMI). However, due to the antenna array size of a base station (e.g., up to 64×4 channel matrix measurable) for eigen-beamforming, it is quite often that a UE reports rank indication (RI)=2 or 3 (under a lower channel matrix dimension, such as 8×4, and quantized PMI) and is actually scheduled by the network with rank-4 physical downlink shared channel (PDSCH), thereby leading to precoding mismatched CSI feedback. For CSF report quantity=cri-RI-CQI, a UE can expect that CSI reference signal (CSI-RS) for CSF is precoded according to SRS sounding and thus only needs to compute and report RI and corresponding CQI. The subsequent transmission from the base station (e.g., gNB) to the UE, including both data and associated demodulation reference signal (DMRS), would be precoded in the same way as the precoding of CSI-RS for CSF.

Thus, the mismatch between a UE's CQI feedback and a base station's scheduled rank under SRS antenna switching creates uncertainty on system performance. Moreover, a network might not have proprietary algorithms to convert CQI values under lower-rank PMI to another CQI under its proprietary higher-rank multiple-input-multiple-output (MIMO) precoder. Therefore, there is a need for a solution for precoding-matched CSI feedback in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is propose schemes, concepts, designs, systems, methods and apparatus pertaining to precoding-matched CSI feedback in mobile communications. It is believed that the various schemes proposed herein may address the issue(s) described herein.

In one aspect, a method may involve measuring one or more of a plurality of ports of a measurement signal. The method may also involve generating a CSI feedback comprising at least a plurality of CQIs with respect to a plurality of hypotheses. Each hypothesis of the plurality of hypotheses is associated with a set of assumptions comprising at least one of a hypothesized rank, existence of multi-user signal, and an antenna port allocation. The antenna port allocation may indicate selected ports from the one or more of the plurality of ports of the measurement reference signal. The method may further involve transmitting the CSI feedback to a network.

In another aspect, a method may involve measuring a channel. The method may also involve generating, based on a result of the measuring, multiple CSI reports with different values of hypothesized ranks. The method may further involve transmitting the multiple CSI reports to a network.

In still another aspect, an apparatus may include a transceiver and a processor coupled to the transceiver. The transceiver may be configured to communicate wirelessly. The processor may be configured to perform operations involving: (a) measuring one or more of a plurality of ports of a measurement signal; (b) generating a CSI feedback comprising at least a plurality of CQIs with respect to a plurality of hypotheses; and (c) transmitting the CSI feedback to a network.

It is noteworthy that, although description provided herein may be in the context of certain radio access technologies, networks and network topologies such as 5G/New Radio (NR) mobile networking, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Industrial IoT (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to precoding-matched CSI feedback in mobile communications. According to the present disclosure, a number of possible solutions may be implemented separately or jointly. That is, although these possible solutions may be described below separately, two or more of these possible solutions may be implemented in one combination or another.

Figure 1:
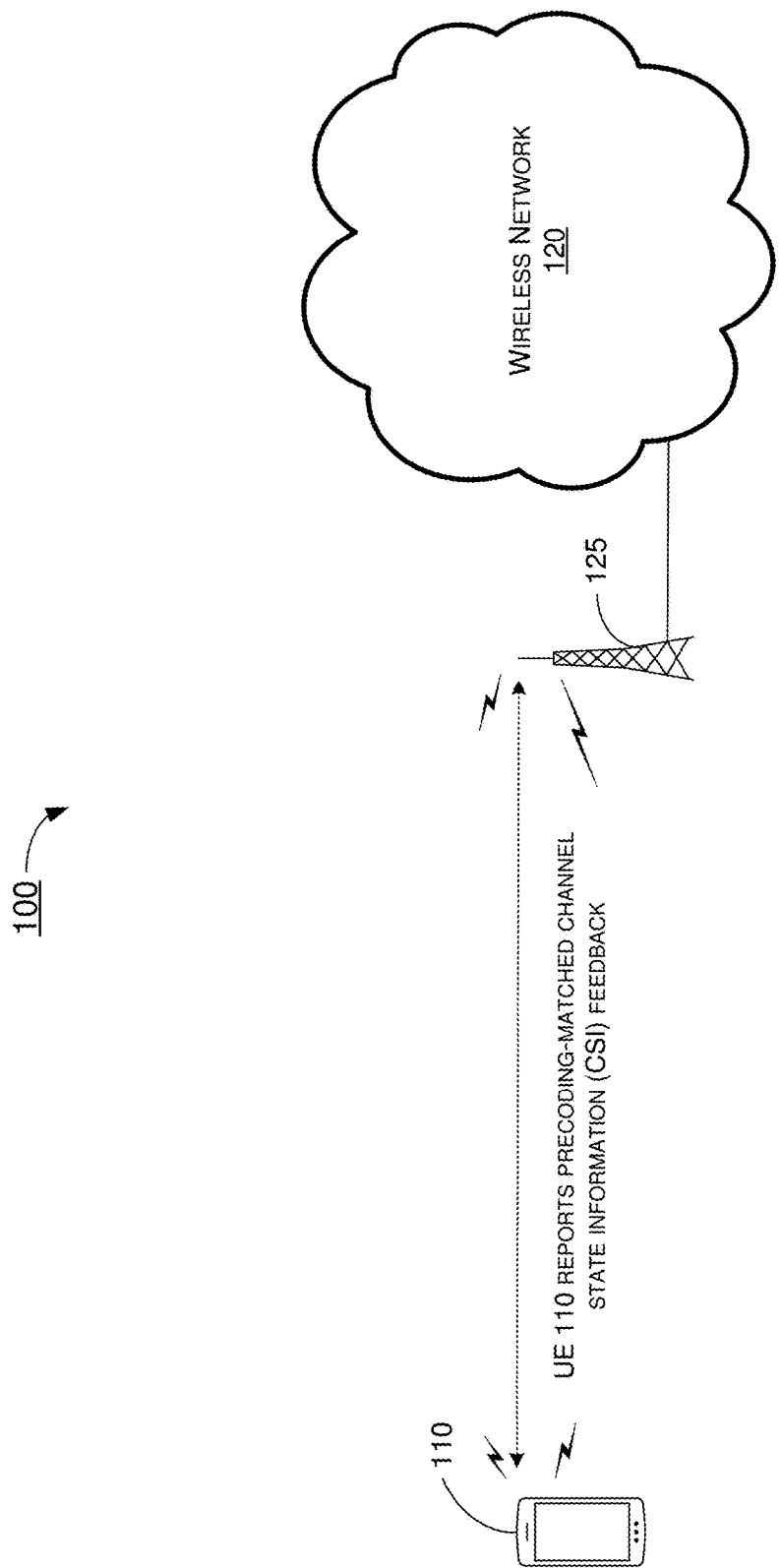
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a user equipment (UE) 110 and a wireless network 120. UE 110 and network 120 may be in wireless communications via one or more network nodes (e.g., eNBs, gNBs and/or transmit/receive points (TRPs)) including a network node 125. In network environment 100, UE 110 and wireless network 120 may be configured to implement various schemes pertaining to precoding-matched CSI feedback in mobile communications in accordance with the present disclosure, as described herein.

Under a proposed scheme in accordance with the present disclosure, to avoid performance degradation due to mismatch between UE CQI feedback and gNB scheduled rank under SRS antenna switching, certain constraints may be introduced. For instance, transmission of data and associated DMRS may be precoded in the same way as precoding of CSI-RS to match the actual gNB scheduled PDSCH DMRS in UE CQI computation. Moreover, the CSI feedback "reportQuantity=cri-RI-CQI" may be used when SRS usage is configured to {antenna switching}. It is believed that neither new CSI feedback (herein interchangeably referred to as "CSI reportQuantity") nor new CSI measurement mechanisms would be required to implement this proposed scheme, other than the addition of normative texts in the 3GPP specification for the two constraints.

Under another proposed scheme in accordance with the present disclosure, UE 110 may be allowed to report multiple pairs of (RI, CQI). For instance, to improve non-PMI CSF (e.g., cri-RI-CQI) over CQI-mismatch, UE 110 may report multiple pairs of (RI, CQI) as a single package to network 120. Given a report configuration associated with measurement resources including four ports (either CSI-RS ports or DMRS ports) for the report configuration, UE 110 may report the following multiple pairs: (a) RI=2; CQI=10; (b) RI=3; CQI=9; and (c) RI=4; CQI=8. Under the proposed scheme, port selection may also be supported. That is, UE 110 may indicate a preferred combination or multiple combinations of (RI, port-combination-index, CQI) to network node 125. It is noteworthy that this is different from legacy port-selection codebook which only allows using ports with contiguous port indexes. In other words, under the proposed scheme, indexes of multiple reported ports may be non-contiguous (e.g., port=0, 2, 3) or contiguous (e.g., port=1, 2, 3). For instance, given a report configuration associated with measurement resources including four ports (either CSI-RS ports or DMRS ports) for the report configuration, UE 110 may report the following multiple pairs: (a) RI=2; port=0, 1; CQI=10; (b) RI=3; port=0, 2, 3; CQI=9; and (c) RI=3; port=0, 1, 2; CQI=8. It is possible to report the CQI values in a more compact way by reporting the difference among them, e.g., reporting differential CQI values relative to the CQI value in (a) by −1 and −2 for (b) and (c), respectively. The aforementioned may be applied to a report associated with CSI-RS or DMRS as measurement resources. It is noteworthy that, although multiple rank-hypothesized CQIs may be reported together, the CSI processing unit (CPU) cost may be the same as the CPU cost in legacy cases with only one CQI report. Advantageously, multiple CSI reports with different values of hypothesized ranks may be reported together and may be computed based on the same one or more measurement resources indicated by a report configuration associated with the reports.

Figure 2:
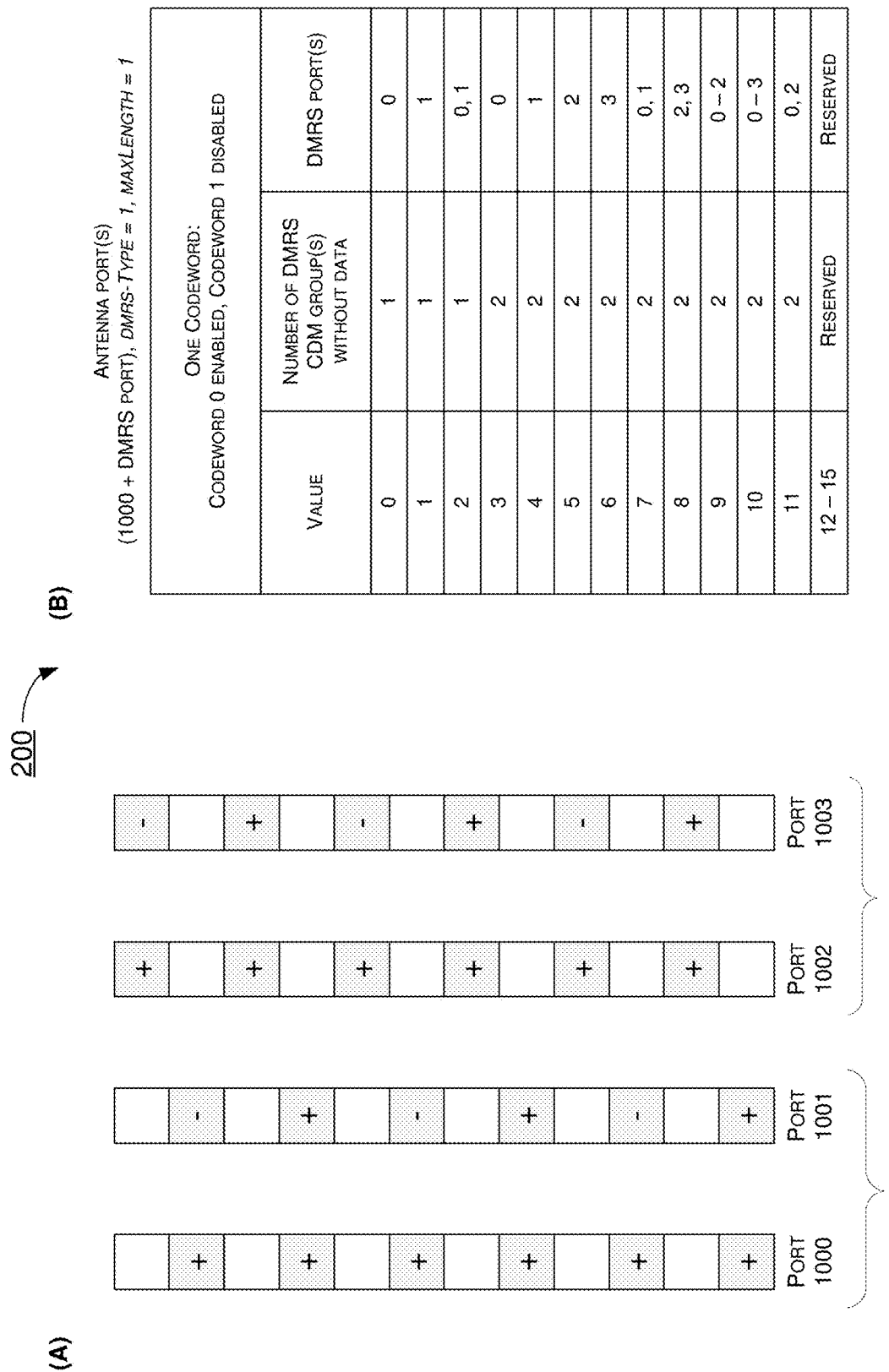
FIG. 2 is a diagram of an example scenario under a proposed scheme in accordance with the present disclosure.

Under yet another proposed scheme in accordance with the present disclosure, an existing antenna-port table for DMRS port indication may be reused for CSI-RS/DMRS port indication of measurement resources and/or single-user (SU) and/or multi-user (MU) assumption, as part of CQI reporting. FIG. 2 illustrates an example scenario 200 of antenna ports used for CQI hypothesis under the proposed scheme. Suppose 1-symbol DMRS Type-1 (e.g., 4 ports with 1-symbol DMRS with two code-division multiplexing (CDM) groups x two frequency domain orthogonal cover codes (FD-OCC)) is configured for PDSCH as shown in part (A) of FIG. 2, and measurement resources, which could be either DMRS or CSI-RS, for CQI feedback have the ports beamformed according to SRS sounding results, UE 110 may report one or multiple pairs of (hypothesis-index, CQI) with the best CQI under corresponding hypotheses. UE 110 may also report MU-CQI along with SU-CQI under the associated rank hypothesis according to row values defined in 3GPP Technical Specification (TS) 38.212 for DMRS antenna port allocation, as shown in part (B) of FIG. 2. We may reuse row values in part (B) of FIG. 2. as hypothesis indexes for CSI reporting. In other words, each row in part (B) of FIG. 2 implies a hypothesis for CSI reporting, and each hypothesis implies a set of assumptions on number of layers, SU/MU, number of CDM groups without data, and/or a port-combination-index. In general, mapping from each of the plurality of hypotheses to its corresponding set of assumptions is pre-defined or RRC configured.

Regarding SU-CQI, in case network node 125 sends down all ports 0~3 based only on the SRS of one UE qualified for rank-4, the SU-CQI may indicate that the triggered CQI report is for SU. When UE 110 reports (value=9, rank-3 SU-CQI), it may be assumed that port 3 would not be transmitted in case PDSCH is scheduled with three spatial layers. The full report of UE 110 may be, for example, {{value=10, rank-4 SU-CQI}, (value=9, rank-3 SU-CQI), (value=7, rank-2 SU-CQI), (value=0, rank-1 SU-CQI)}. The value selection may depend on how network node 125 sorts its beam vectors.

Regarding MU-CQI, in case network node 125 pairs port (0,1) from the SRS sounding result from a first UE (UE1) and port (2,3) from the SRS sounding result from a second UE (UE2), then one of two approaches may be undertaken. In a first approach, network node 125 may trigger MU-CQI such that UE1 may take interference of port (2,3), either interference rejection combining (IRC) or multiple-input-multiple-output interference cancellation (MIMO-IC), into CQI consideration when reporting (value=7, rank-2 MU-CQI): the row corresponding to value=7 indicates preferred ports, port 0 and port 1, are in the same CDM group, and that number of CDM groups without data is 2, which implies the MU-CQI is derived by assuming MU interference exists. Similarly, UE2 may report (value=8, rank-2 MU-Cal) with the existence of port (0,1) in mind. In a second approach, DMRS port indication may be utilized to imply existence of MU. For instance, with respect to value 7 and value 8 in the DMRS table (with the number of code-division multiplexing (CDM) groups without data being 2), for MU-CQI report, UE1 may hypothesize either port (0,1) or port (2,3) as the serving 2-layer with the assumption of both ports of the other CDM group as UE2 interference for rank-2 MU-CQI. Moreover, with respect to values 3~6 in the DMRS table (with the number of CDM groups without data being 2), for MU-CQI report, UE1 may only hypothesize one of port 0~3 as the serving 1-layer with the assumption of both ports of the other CDM group as UE2 interference for rank-1 MU-CQI.

Under the proposed scheme, generalization to higher number of ports (2-symbol DMRS) and CDM groups (DMRS type-2) may be straightforward. The same DMRS reference signal (DMRS-RS) pattern configured for PDSCH may be added to the choice of CSI-RS under SRS-antenna switching (DMRS-pattern-as-CSI-RS for CSF). In other words, for non-PMI reporting, the measurement resource may be CSI-RS or DMRS.

Under the proposed scheme, indication for CSI triggering may be carried by the downlink/uplink (DL/UL) grant (e.g., DCI). Additionally, indication of SU/MU assumption for CSF may be carried by the a DL grant or a UL grant. For instance, a DL/UL grant may trigger a CSI report which may be calculated based on the antenna-port indication and/or SU/MU assumption indicated by the DL/UL grant. As an illustrative example, the antenna port allocation of the to-be-scheduled PDSCH DMRS DCI value may be explicitly signaled in DCI format 0_1 for an aperiodic CSI triggering. The DCI format 0_1 may be modified with a new field "DL antenna ports" to indicate the to-be-scheduled-PDSCH-DMRS port allocation. In an event that none of the UEs is aware of SU or MU until DCI signaling, in case the aperiodic CSI triggering is with the new "DL antenna ports" of DCI format 0_1 given by value 7, this may indicate that SRS antenna switching renders the decision of network node 125 to allocate port (0,1) of CDM Group 0 to UE1 and allocate CDM Group 1 to UE2 to form a MU-MIMO pair. In such case, UE1 may take the ports of CDM Group 1 into consideration when computing its achievable MU-CQI using port (0,1). Alternatively, or additionally, UE1 may be configured to report SU-MIMO under port (0,1) without port (2,3).

In view of the above, highlights of the various proposed schemes may be summarized below.

With respect to precoded/beamformed CSI-RS for RI and CQI feedback, under SRS antenna switching the network node 125 may beamform CSI-RS with the same precoder of the to-be-scheduled PDSCH and/or DMRS. Additionally, network node 125 may configure CSI reportQuantity to cri-RI-CQI in a CSI report configuration.

With respect to multiple-hypothesis SU-CQI and MU-CQI, UE 110 may receive CSI-RS precoded with the same precoder to be applied on PDSCH and/or DMRS ports. In a first approach, UE 110 may also be configured with new CSI reportQuantity to all possible {RI=i, CQI_i}, where i=1 to maximum MIMO layers. In a second approach, UE 110 may also be configured with new CSI reportQuantity to all possible {RI=1, layer-index-1, CQI_1}, {RI=2, layer-index-1, layer-index-2, CQI_2}, . . . {RI=i, layer-index-1, . . . , layer-index-i, CQI_i}, . . . , where i is the hypothesized number of ranks from 1 to maximum MIMO layers, and {layer-index-1, . . . , layer-index-i} is port-combination for i layers. In a third approach, UE 110 may also be configured new CSI reportQuantity {hypothesis-index, CQI} for SU and/or MU scenarios and each hypothesis-index is associated with a set of assumptions on number of layers, SU/MU, number of CDM groups without data, and/or a port-combination-index. The hypothesis-index may or may not be signaled by network. For instance, UE 110 may hypothesize antenna port allocation corresponding to each hypothesis-index and may compute the best CQI among hypotheses of the same-rank under single-user assumption. Moreover, UE 110 may report the best SU-CQI as {hypothesis-index_1, CQI_1}, {hypothesis-index_2, CQI_2}, . . . , {hypothesis-index_i, CQI_i}, . . . , where i is the hypothesized number of ranks from 1 to maximum MIMO layers. UE 110 may also hypothesize antenna port allocation corresponding to various hypothesis-indexes that allow multi-UE and UE 110 may compute the best CQI among hypotheses of the same-rank under multi-user assumption. For instance, for each hypothesis-index associated with two or more CDM groups, UE 110 may take into account the interference from other ports allowed by the specification to determine the best CQI and report best MU-CQI as {hypothesis-index_1, CQI_1}, {hypothesis-index_2, CQI_2}, . . . , {hypothesis-index_i, CQI_i}, . . . , where i is the hypothesized number of ranks from 1 to maximum MIMO layers.

With respect to DMRS pattern as CSI-RS, DMRS pattern may be added as a new choice of (instead of) CSI-RS pattern for CSF under SRS antenna switching.

With respect to port-allocated aperiodic CSI, when triggering aperiodic CSI, network node 125 may specify exactly the antenna-port allocation DCI value in DCI format 0_1 such that UE 110 may report SU-CQI or MU-CQI, or both, under the given port allocation.

Illustrative Implementations

Figure 3:
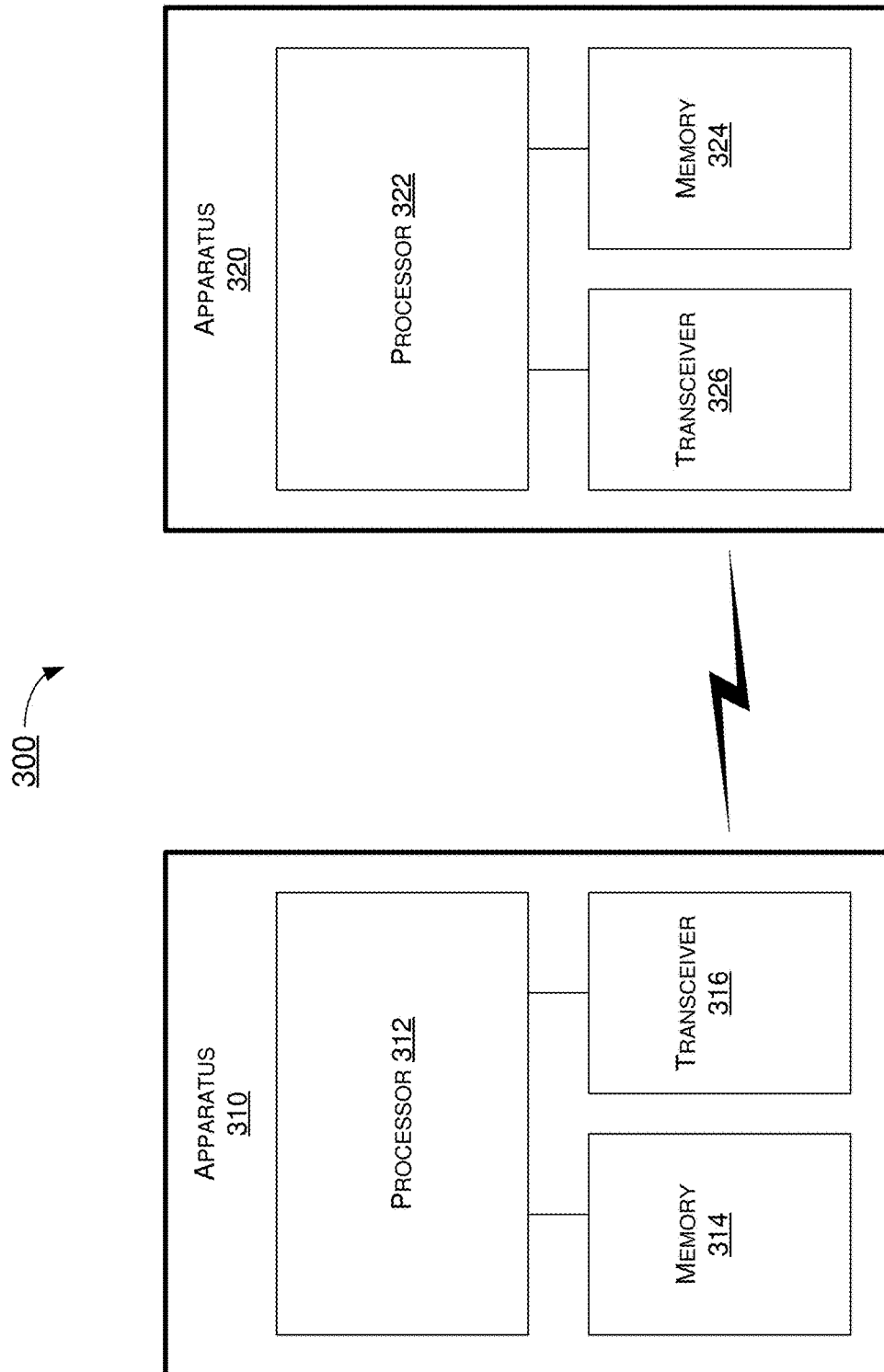
FIG. 3 is a block diagram of an example communication system in accordance with an implementation of the present disclosure.

FIG. 3 illustrates an example communication system 300 having at least an example apparatus 310 and an example apparatus 320 in accordance with an implementation of the present disclosure. Each of apparatus 310 and apparatus 320 may perform various functions to implement schemes, techniques, processes and methods described herein pertaining to precoding-matched CSI feedback in mobile communications, including the various schemes described above with respect to various proposed designs, concepts, schemes, systems and methods described above, including network environment 100, as well as processes described below.

Each of apparatus 310 and apparatus 320 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 310 and apparatus 320 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 310 and apparatus 320 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 310 and apparatus 320 may be implemented in a smart thermostat, a smart fridge, a smart door lock, a wireless speaker or a home control center. When implemented in or as a network apparatus, apparatus 310 and/or apparatus 320 may be implemented in an eNodeB in an LTE, LTE-Advanced or LTE-Advanced Pro network or in a gNB or TRP in a 5G network, an NR network or an IoT network.

In some implementations, each of apparatus 310 and apparatus 320 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 310 and apparatus 320 may be implemented in or as a network apparatus or a UE. Each of apparatus 310 and apparatus 320 may include at least some of those components shown in FIG. 3 such as a processor 312 and a processor 322, respectively, for example. Each of apparatus 310 and apparatus 320 may further include one or more other components not pertinent to the proposed scheme of the present disclosure (e.g., internal power supply, display device and/or user interface device), and, thus, such component(s) of apparatus 310 and apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC or RISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including those pertaining to precoding-matched CSI feedback in mobile communications in accordance with various implementations of the present disclosure.

In some implementations, apparatus 310 may also include a transceiver 316 coupled to processor 312. Transceiver 316 may be capable of wirelessly transmitting and receiving data. In some implementations, transceiver 316 may be capable of wirelessly communicating with different types of wireless networks of different radio access technologies (RATs). In some implementations, transceiver 316 may be equipped with a plurality of antenna ports (not shown) such as, for example, four antenna ports. That is, transceiver 316 may be equipped with multiple transmit antennas and multiple receive antennas for multiple-input multiple-output (MIMO) wireless communications. In some implementations, apparatus 320 may also include a transceiver 326 coupled to processor 322. Transceiver 326 may include a transceiver capable of wirelessly transmitting and receiving data. In some implementations, transceiver 326 may be capable of wirelessly communicating with different types of UEs/wireless networks of different RATs. In some implementations, transceiver 326 may be equipped with a plurality of antenna ports (not shown) such as, for example, four antenna ports. That is, transceiver 326 may be equipped with multiple transmit antennas and multiple receive antennas for MIMO wireless communications.

In some implementations, apparatus 310 may further include a memory 314 coupled to processor 312 and capable of being accessed by processor 312 and storing data therein. In some implementations, apparatus 320 may further include a memory 324 coupled to processor 322 and capable of being accessed by processor 322 and storing data therein. Each of memory 314 and memory 324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 314 and memory 324 may include a type of read-only memory (ROM) such as mask ROM, programmable ROM (PROM), erasable programmable ROM (EPROM) and/or electrically erasable programmable ROM (EEPROM). Alternatively, or additionally, each of memory 314 and memory 324 may include a type of non-volatile random-access memory (NVRAM) such as flash memory, solid-state memory, ferroelectric RAM (Fe-RAM), magnetoresistive RAM (MRAM) and/or phase-change memory. Alternatively, or additionally, each of memory 314 and memory 324 may include a UICC.

Each of apparatus 310 and apparatus 320 may be a communication entity capable of communicating with each other using various proposed schemes in accordance with the present disclosure. For illustrative purposes and without limitation, a description of capabilities of apparatus 310, as a UE (e.g., UE 110), and apparatus 320, as a network node (e.g., network node 125) of a wireless network (e.g., wireless network 120), is provided below.

Under a proposed scheme in accordance with the present disclosure with respect to precoding-matched CSI feedback in mobile communications, processor 312 of apparatus 310, implemented in or as UE 110, may measure, via transceiver 316, one or more of a plurality of ports of a measurement signal. Additionally, processor 312 may generate a CSI feedback comprising at least a plurality of CQIs with respect to a plurality of hypotheses. Each hypothesis of the plurality of hypotheses is associated with a set of assumptions comprising at least one of a hypothesized rank, existence of multi-user signal, and an antenna port allocation. The antenna port allocation may indicate selected ports from the one or more of the plurality of ports of the measurement reference signal. Moreover, processor 312 may transmit, via transceiver 316, the CSI feedback to a network (e.g., network 120 via apparatus 320 as network node 125).

In some implementations, the CSI feedback may include a plurality of indicators of selected hypotheses among the plurality of hypotheses and the plurality of CQIs with respect to the plurality of selected hypotheses.

In some implementations, the CSI feedback may include a plurality of RIs and the plurality of CQIs with respect to a plurality of MIMO layers corresponding to the plurality of hypothesized ranks.

In some implementations, the CSI feedback may include a plurality of RIs, a plurality of sets of port indexes, and the plurality of CQIs with respect to a plurality of MIMO layers corresponding to the plurality of hypothesized ranks.

In some implementations, in generating the CSI feedback, processor 312 may perform certain operations. For instance, processor 312 may hypothesize the antenna port allocation corresponding to each hypothesis of the plurality of hypotheses. Additionally, processor 312 may compute a best CQI among respective one or more of the plurality of CQIs with respect to a respective hypothesized rank of the plurality of hypothesized ranks under an SU assumption. In such cases, in reporting the CSI feedback, processor 312 may report a best SU-CQI by indicating a respective one of the plurality of hypothesis-indexes and a respective CQI of the plurality of CQIs with respect to each of a plurality of MIMO layers corresponding to the plurality of hypothesized ranks.

In some implementations, in generating the CSI feedback, processor 312 may perform other operations. For instance, processor 312 may hypothesize an antenna port allocation corresponding to each hypothesis of the plurality of hypotheses. Additionally, processor 312 may compute a best CQI among respective one or more of the plurality of CQIs with respect to a respective hypothesized rank of the plurality of hypothesized ranks under an MU assumption. In such cases, in reporting the CSI feedback, processor 312 may report a best MU-CQI by indicating a respective one of the plurality of hypotheses and a respective CQI of the plurality of CQIs with respect to each of a plurality of MIMO layers corresponding to the plurality of hypothesized ranks. Furthermore, each hypothesis of the plurality of hypotheses may include a respective port combination index indicating one or more respective ports corresponding to one of the plurality of CQIs.

In some implementations, the measurement reference signal may include either a DMRS from the network or a CSI-RS from the network. In such cases, the ports of the measurement reference signal may be precoded by one or more precoders that are applied on one or more of the plurality of ports used in reception of the DMRS or a PDSCH. Moreover, in generating the CSI feedback, processor 312 may generate the CSI feedback based on a result of the measuring.

In some implementations, processor 312 may further receive, via transceiver 316, from the network a DL or UL grant that indicates an SU or MU assumption used in generating the CSI feedback.

In some implementations, processor 312 may further receive, via transceiver 316, from the network an indication of one or more of the plurality of hypotheses. In such cases, in transmitting the CSI feedback to the network, processor 312 may report an SU-CQI, an MU-CQI, or both the SU-CQI and the MU-CQI under assumptions associated with the indicated hypotheses.

Under another proposed scheme in accordance with the present disclosure with respect to precoding-matched CSI feedback in mobile communications, processor 312 of apparatus 310, implemented in or as UE 110, may measure, via transceiver 316, a channel. Moreover, processor 312 may generate, based on a result of the measuring, multiple CSI reports with different values of hypothesized ranks. Furthermore, processor 312 may transmit, via transceiver 316, the multiple CSI reports to a network (e.g., network 120 via apparatus 320 as network node 125).

In some implementations, in transmitting the multiple CSI reports, processor 312 may report multiple pairs each comprising a pair of a respective RI corresponding to one of the multiple hypothesized ranks and a respective CQI. In some implementations, each of the multiple CSI reports may further indicate a respective selection of ports corresponding to one of the multiple pairs. In some implementations, the respective selection of ports indicated in at least one of the multiple CSI reports may include a selection of ports with non-contiguous port indexes.

In some implementations, in generating the multiple CSI reports, processor 312 may generate the multiple CSI reports using a report configuration associated with measurement resources comprising one or more ports used in reception of a CSI-RS or a DMRS.

In some implementations, in measuring the channel, processor 312 may measure one or more aspects of a DMRS from the network or measuring one or more aspects of a CSI-RS from the network.

Illustrative Processes

Figure 4:
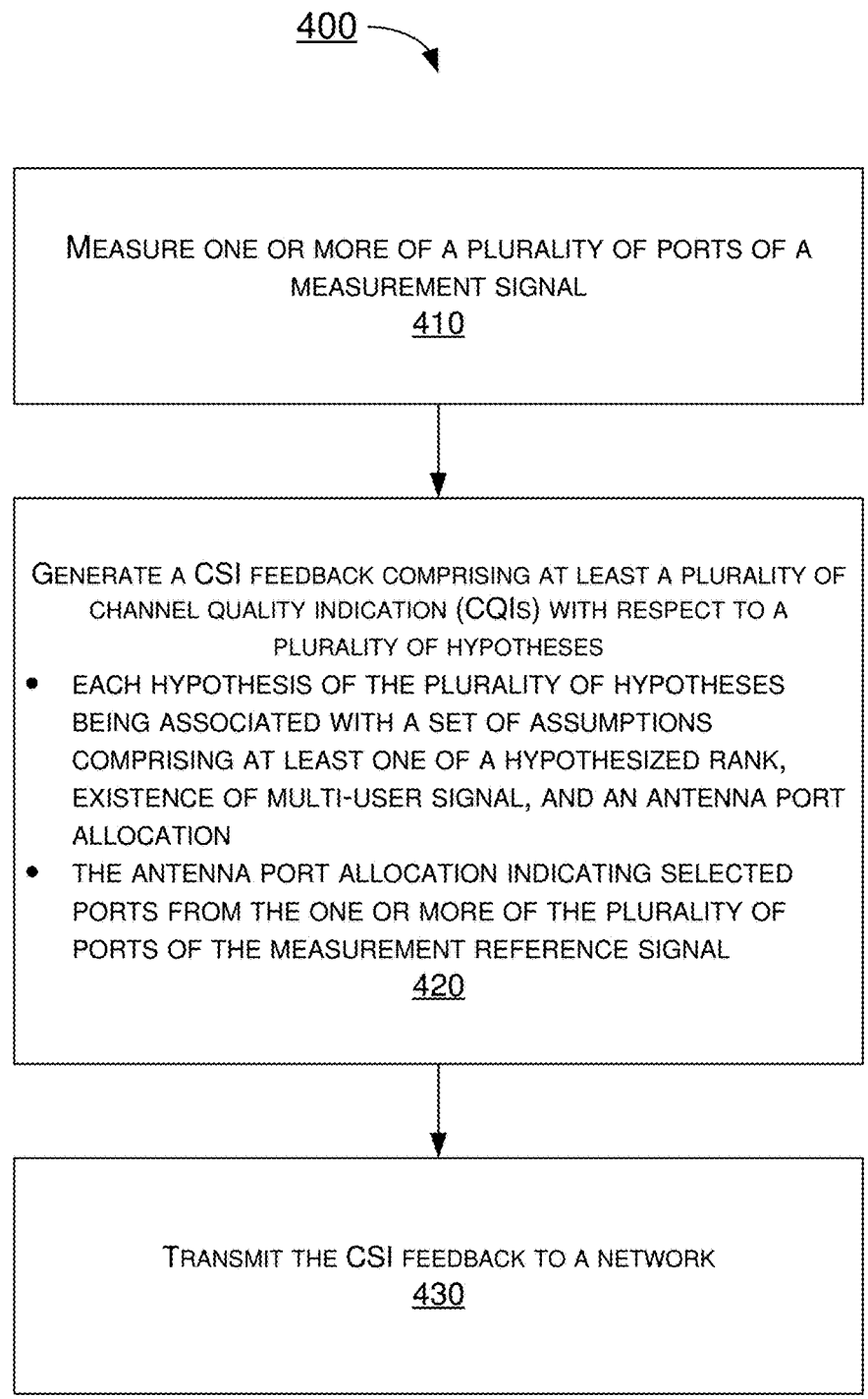
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including those described above. More specifically, process 400 may represent an aspect of the proposed concepts and schemes pertaining to precoding-matched CSI feedback in mobile communications. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 310 and apparatus 320 as well as any variations thereof. Solely for illustrative purposes and without limiting the scope, process 400 is described below in the context of apparatus 310 as a UE (e.g., UE 110) and apparatus 320 as a communication entity such as a network node or base station (e.g., network node 125) of a wireless network (e.g., wireless network 120). Process 400 may begin at block 410.

At 410, process 400 may involve processor 312 of apparatus 310, implemented in or as UE 110, measuring, via transceiver 316, one or more of a plurality of ports of a measurement signal. Process 400 may proceed from 410 to 420.

At 420, process 400 may involve processor 312 generating a CSI feedback comprising at least a plurality of CQIs with respect to a plurality of hypotheses. Each hypothesis of the plurality of hypotheses is associated with a set of assumptions comprising at least one of a hypothesized rank, existence of multi-user signal, and an antenna port allocation. The antenna port allocation may indicate selected ports from the one or more of the plurality of ports of the measurement reference signal. Process 400 may proceed from 420 to 430.

At 430, process 400 may involve processor 312 transmitting, via transceiver 316, the CSI feedback to a network (e.g., network 120 via apparatus 320 as network node 125).

In some implementations, the CSI feedback may include a plurality of indicators of selected hypotheses among the plurality of hypotheses and the plurality of CQIs with respect to the plurality of selected hypotheses.

In some implementations, the CSI feedback may include a plurality of RIs and the plurality of CQIs with respect to a plurality of MIMO layers corresponding to the plurality of hypothesized ranks.

In some implementations, the CSI feedback may include a plurality of RIs, a plurality of sets of port indexes, and the plurality of CQIs with respect to a plurality of MIMO layers corresponding to the plurality of hypothesized ranks.

In some implementations, in generating the CSI feedback, process 400 may involve processor 312 performing certain operations. For instance, process 400 may involve processor 312 hypothesizing the antenna port allocation corresponding to each hypothesis of the plurality of hypotheses. Additionally, process 400 may involve processor 312 computing a best CQI among respective one or more of the plurality of CQIs with respect to a respective hypothesized rank of the plurality of hypothesized ranks under an SU assumption. In such cases, in reporting the CSI feedback, process 400 may involve processor 312 reporting a best SU-CQI by indicating a respective one of the plurality of hypotheses and a respective CQI of the plurality of CQIs with respect to each of a plurality of MIMO layers corresponding to the plurality of hypothesized ranks.

In some implementations, in generating the CSI feedback, process 400 may involve processor 312 performing other operations. For instance, process 400 may involve processor 312 hypothesizing an antenna port allocation corresponding to each hypothesis of the plurality of hypotheses. Additionally, process 400 may involve processor 312 computing a best CQI among respective one or more of the plurality of CQIs with respect to a respective hypothesized rank of the plurality of hypothesized ranks under an MU assumption. In such cases, in reporting the CSI feedback, process 400 may involve processor 312 reporting a best MU-CQI by indicating a respective one of the plurality of hypotheses and a respective CQI of the plurality of CQIs with respect to each of a plurality of MIMO layers corresponding to the plurality of hypothesized ranks. Furthermore, each hypothesis of the plurality of hypotheses may include a respective port combination index indicating one or more respective ports corresponding to one of the plurality of CQIs.

In some implementations, the measurement reference signal may include either a DMRS from the network or a CSI-RS from the network. In such cases, the ports of the measurement reference signal may be precoded by one or more precoders that are applied on one or more of the plurality of ports used in reception of the DMRS or a PDSCH. Moreover, in generating the CSI feedback, process 400 may involve processor 312 generating the CSI feedback based on a result of the measuring.

In some implementations, process 400 may further involve processor 312 receiving, via transceiver 316, from the network a DL or UL grant that indicates an SU or MU assumption used in generating the CSI feedback.

In some implementations, process 400 may further involve processor 312 receiving, via transceiver 316, from the network an indication of one or more of the plurality of hypotheses. In such cases, in transmitting the CSI feedback to the network, process 400 may involve processor 312 reporting an SU-CQI, an MU-CQI, or both the SU-CQI and the MU-CQI under assumptions associated with the indicated hypotheses.

Figure 5:
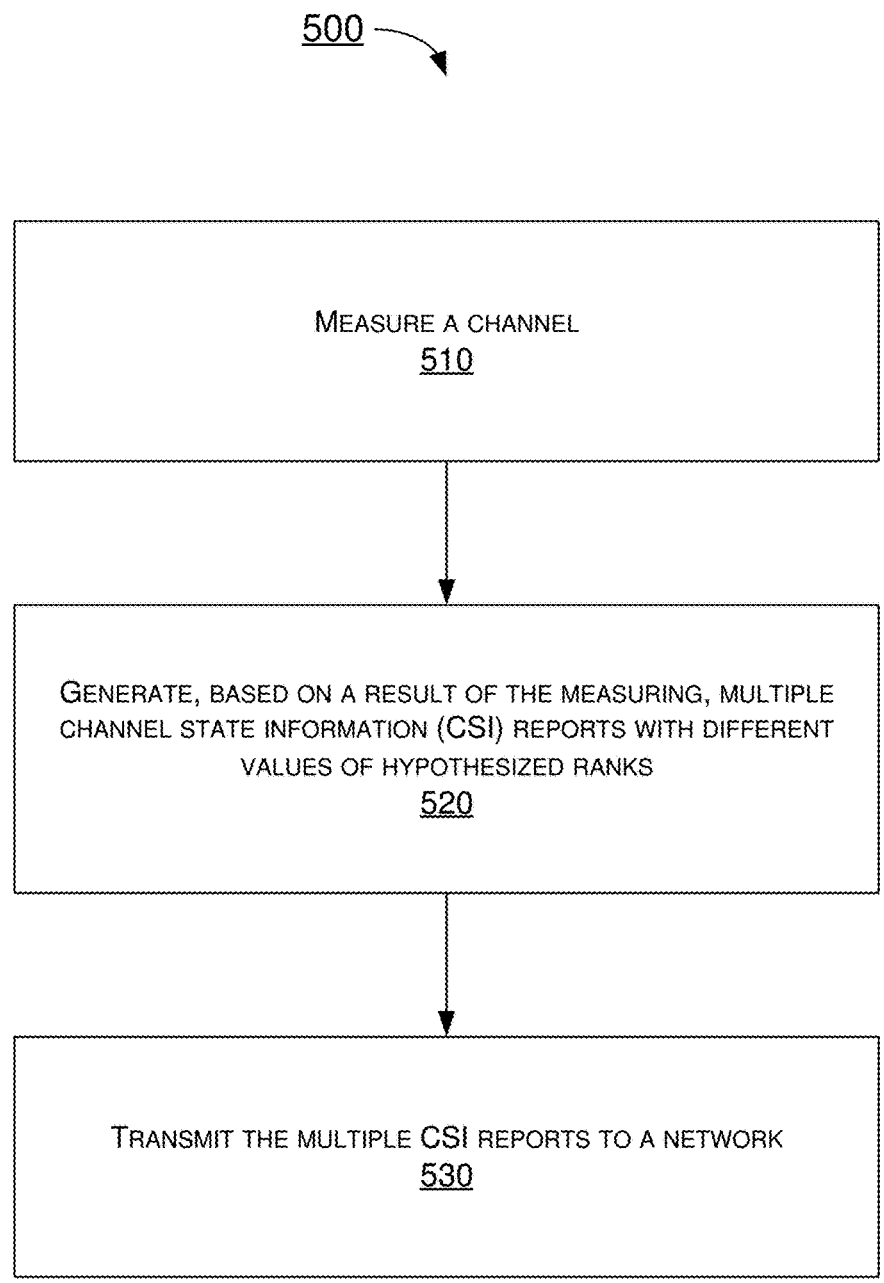
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including those described above. More specifically, process 500 may represent an aspect of the proposed concepts and schemes pertaining to precoding-matched CSI feedback in mobile communications. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 310 and apparatus 320 as well as any variations thereof. Solely for illustrative purposes and without limiting the scope, process 500 is described below in the context of apparatus 310 as a UE (e.g., UE 110) and apparatus 320 as a communication entity such as a network node or base station (e.g., network node 125) of a wireless network (e.g., wireless network 120). Process 500 may begin at block 510.

At 510, process 500 may involve processor 312 of apparatus 310, implemented in or as UE 110, measuring, via transceiver 316, a channel. Process 500 may proceed from 510 to 520.

At 520, process 500 may involve processor 312 generating, based on a result of the measuring, multiple CSI reports with different values of hypothesized ranks. Process 500 may proceed from 520 to 530.

At 530, process 500 may involve processor 312 transmitting, via transceiver 316, the multiple CSI reports to a network (e.g., network 120 via apparatus 320 as network node 125).

In some implementations, in transmitting the multiple CSI reports, process 500 may involve processor 312 reporting multiple pairs each comprising a pair of a respective RI corresponding to one of the multiple hypothesized ranks and a respective CQI. In some implementations, each of the multiple CSI reports may further indicate a respective selection of ports corresponding to one of the multiple pairs. In some implementations, the respective selection of ports indicated in at least one of the multiple CSI reports may include a selection of ports with non-contiguous port indexes.

In some implementations, in generating the multiple CSI reports, process 500 may involve processor 312 generating the multiple CSI reports using a report configuration associated with measurement resources comprising one or more ports used in reception of a CSI-RS or a DMRS.

In some implementations, in measuring the channel, process 500 may involve processor 312 measuring one or more aspects of a DMRS from the network or measuring one or more aspects of a CSI-RS from the network.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
  measuring one or more of a plurality of ports of a measurement reference signal;
  generating, a channel-state-information (CSI) feedback comprising at least a plurality of channel quality indication (CQIs) with respect to a plurality of hypotheses, wherein each hypothesis of the plurality of hypotheses is associated with a set of assumptions comprising at least one of a hypothesized rank, existence of multi-user signal, and an antenna port allocation, and wherein the antenna port allocation indicates selected ports from the one or more of the plurality of ports of the measurement reference signal; and
  transmitting the CSI feedback to a network,
  wherein the generating of the CSI feedback comprises performing either a first procedure or a second procedure,
  wherein the first procedure comprises:
    hypothesizing the antenna port allocation corresponding to each hypothesis of the plurality of hypotheses; and
    computing a best CQI among respective one or more of the plurality of CQIs with respect to a respective hypothesized rank of the plurality of hypothesized ranks under a single-user (SU) assumption, and
  wherein the second procedure comprises:
    hypothesizing an antenna port allocation corresponding to each hypothesis of the plurality of hypotheses; and
    computing a best CQI among respective one or more of the plurality of CQIs with respect to a respective hypothesized rank of the plurality of hypothesized ranks under a multi-user (MU) assumption.

2. The method of claim 1, wherein the CSI feedback comprises a plurality of indicators of selected hypotheses among the plurality of hypotheses and the plurality of CQIs with respect to the plurality of selected hypotheses.

3. The method of claim 1, wherein the CSI feedback comprises a plurality of rank indicators (RIs) and the plurality of CQIs with respect to a plurality of multiple-input-multiple-output (MIMO) layers corresponding to the plurality of hypothesized ranks.

4. The method of claim 1, wherein the CSI feedback comprises a plurality of rank indicators (RIs), a plurality of sets of port indexes, and the plurality of CQIs with respect to a plurality of multiple-input-multiple-output (MIMO) layers corresponding to the plurality of hypothesized ranks.

5. The method of claim 1, wherein, in the first procedure, the reporting of the CSI feedback comprises reporting a best SU-CQI comprising indicating a respective one of the plurality of hypotheses and a respective CQI of the plurality of CQIs with respect to each of a plurality of multiple-input-multiple-output (MIMO) layers corresponding to the plurality of hypothesized ranks.

6. The method of claim 1, wherein, in the second procedure, the reporting of the CSI feedback comprises reporting a best MU-CQI comprising indicating a respective one of the plurality of hypotheses and a respective CQI of the plurality of CQIs with respect to each of a plurality of multiple-input-multiple-output (MIMO) layers corresponding to the plurality of hypothesized ranks.

7. The method of claim 1, wherein each hypothesis of the plurality of hypotheses comprises a respective port combination index indicating one or more respective ports corresponding to one of the plurality of CQIs.

8. The method of claim 1, wherein the measurement reference signal comprises either a demodulation reference signal (DMRS) from the network or a CSI reference signal (CSI-RS) from the network, wherein the ports of the measurement reference signal are precoded by one or more precoders that are applied on one or more of the plurality of ports used in reception of the DMRS or a physical downlink shared channel (PDSCH), and wherein the generating of the CSI feedback comprises generating the CSI feedback based on a result of the measuring.

9. The method of claim 1, further comprising:
receiving from the network a downlink (DL) or uplink (UL) grant that indicates a single-user (SU) or multi-user (MU) assumption used in generating the CSI feedback.

10. The method of claim 1, further comprising:
receiving from the network an indication of one or more of the plurality of hypotheses,
wherein the transmitting of the CSI feedback to the network comprises reporting a single-user CQI (SU-CQI), a multi-user CQI (MU-CQI), or both the SU-CQI and the MU-CQI under assumptions associated with the indicated hypotheses.

11. A method, comprising:
measuring a channel;
generating, based on a result of the measuring, multiple channel state information (CSI) reports with different values of hypothesized ranks; and
transmitting the multiple CSI reports to a network,
wherein the transmitting of the multiple CSI reports comprises reporting multiple pairs each comprising a pair of a respective rank indication (RI) corresponding to one of the multiple hypothesized ranks and a respective channel quality indication (CQI).

12. The method of claim 11, wherein each of the multiple CSI reports further indicates a respective selection of ports corresponding to one of the multiple pairs.

13. The method of claim 12, wherein the respective selection of ports indicated in at least one of the multiple CSI reports comprises a selection of ports with non-contiguous port indexes.

14. The method of claim 11, wherein the generating of the multiple CSI reports comprises generating the multiple CSI reports using a report configuration associated with measurement resources comprising one or more ports used in reception of a channel state information reference signal (CSI-RS) or a demodulation reference signal (DMRS).

15. The method of claim 11, wherein the measuring of the channel comprises measuring one or more aspects of a demodulation reference signal (DMRS) from the network or measuring one or more aspects of a channel state information reference signal (CSI-RS) from the network.

16. An apparatus, comprising:
a transceiver configured to communicate wirelessly; and
a processor coupled to the transceiver and configured to perform operations comprising:
measuring, via the transceiver, a plurality of ports of a measurement reference signal;
generating a channel-state-information (CSI) feedback comprising at least a plurality of channel quality indication (CQIs) with respect to a plurality of hypotheses, wherein each hypothesis of the plurality of hypotheses is associated with a set of assumptions comprising at least one of a hypothesized rank, existence of multi-user signal, and an antenna port allocation, and wherein the antenna port allocation indicates selected ports from the one or more of the plurality of ports of the measurement reference signal; and
transmitting, via the transceiver, the CSI feedback to a network,
wherein the generating of the CSI feedback comprises performing either a first procedure or a second procedure,
wherein the first procedure comprises:
hypothesizing the antenna port allocation corresponding to each hypothesis of the plurality of hypotheses; and
computing a best CQI among respective one or more of the plurality of CQIs with respect to a respective hypothesized rank of the plurality of hypothesized ranks under a single-user (SU) assumption, and
wherein the second procedure comprises:
hypothesizing an antenna port allocation corresponding to each hypothesis of the plurality of hypotheses; and
computing a best CQI among respective one or more of the plurality of CQIs with respect to a respective hypothesized rank of the plurality of hypothesized ranks under a multi-user (MU) assumption.

17. The apparatus of claim 16, wherein the CSI feedback comprises one of:
a plurality of indicators of selected hypotheses among the plurality of hypotheses and the plurality of CQIs with respect to the plurality of selected hypotheses;
a plurality of rank indicators (RIs) and the plurality of CQIs with respect to a plurality of multiple-input-multiple-output (MIMO) layers corresponding to the plurality of hypothesized ranks; and
the plurality of RIs, a plurality of layer indexes, and the plurality of CQIs with respect to the plurality of MIMO layers corresponding to the plurality of hypothesized ranks.

* * * * *